July 14, 1964

JAMES E. WEBB
ADMINISTRATOR OF THE NATIONAL AERONAUTICS
AND SPACE ADMINISTRATION
HIGH PRESSURE FOUR-WAY VALVE 3,140,728

Filed April 20, 1961

INVENTORS
William F. Mac Glashan jr.
Harry J. Margraf

By
Attorney

United States Patent Office 3,140,728
Patented July 14, 1964

3,140,728
HIGH PRESSURE FOUR-WAY VALVE
James E. Webb, Administrator of the National Aeronautics and Space Administration, with respect to an invention of William F. MacGlashan, Jr., and Harry J. Margraf
Filed Apr. 20, 1961, Ser. No. 109,377
5 Claims. (Cl. 137—625.69)

This invention relates to high pressure valves, more particularly to valves utilizing O-rings. Valves of this type have been limited in their range of application for the reason that conventional valves utilizing O-rings are confronted with the problem that O-rings tend to be unseated and caused to fail when attempt is made to pass the O-rings across inlet or outlet ports.

The present invention is directed primarily to this problem, and accordingly, included in the objects of this invention are:

First, to provide a high pressure valve which incorporates a novelly arranged inlet port construction which permits an O-ring to pass from one to the other side of the inlet port or outlet port without danger that the O-ring will be dislodged by high pressure at the inlet port.

Second, to provide a valve which is particularly adapted for four-way valves operating under high pressure differentials, is also applicable to other types of valves such as three-way valves or normally closed or normally open line valves.

With the above and other objects in view as may appear hereinafter, reference is directed to the accompanying drawings, in which.

Figure 1:
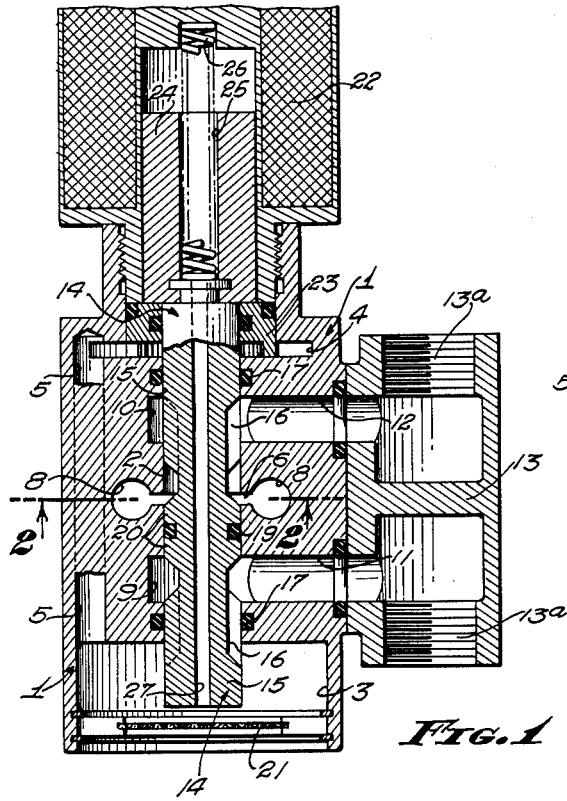
FIGURE 1 is a longitudinal sectional view of the high pressure valve.

The high pressure valve illustrated in the drawings includes a valve body 1 having a longitudinal bore 2 therethrough. The ends of the bore communicate with end chambers 3 and 4 which are interconnected by a passage 5.

Midway between the end chambers 3 and 4, the bore 2 is intersected by an annular inlet port 6 having an axial dimension approximating or less than the O-ring which cooperates therewith. The inlet port is formed by cutting a narrow annular groove in the wall of the bore 2.

Figure 2:
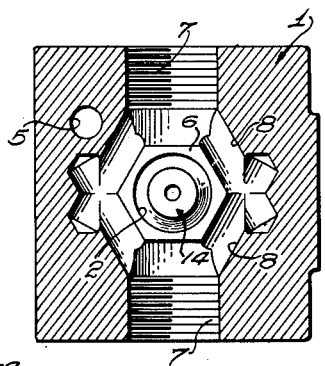
FIGURE 2 is an enlarged fragmentary transverse sectional view taken through 2—2 of FIG. 1 showing particularly the inlet port.

In order to form an inlet connection with the inlet port 6, two recesses 7 are formed in opposite sides of the valve body in the plane of the inlet port 6 as shown in FIG. 2. One of these recesses is internally screwthreaded to receive an inlet line, not shown, whereas the other is screwthreaded to receive a plug, also omitted from the illustration. Each recess 7 is utilized to permit the drilling of a pair of diverging sockets 8. The two pairs of sockets 8 intersect each other and the annular inlet port 6 but do not intersect the longitudinal bore 2 so that the inlet port 6 is substantially surrounded by an inlet chamber of large area. Fluid pressure is therefore equally distributed around the entire circumference of the annular inlet port 6.

Between the inlet port 6 and the end chambers 3 and 4, the bore 2 is provided with similar annular outlet channels 9 and 10. These channels intersect side passages 11 and 12 respectively. In the drawings, these passages are shown as connected to a common dual outlet fitting 13 having opposed outlet ports 13a and 13b.

The bore 2 receives a valve armature 14 having end lands 15 which move in the regions between the end chambers 3 and 4 and the outlet channels 9 and 10. The proximal ends of the lands 15 are provided with a series of axially extending slots 16. The bore 2 is provided with O-rings 17 between the end chamber 3 and the outlet channel 9 and between the end chamber 4 and outlet channel 10 respectively.

When the outlet channel 9 is in communication with the end chamber 3, the axial slots 16 of the corresponding end land support the corresponding O-ring 17 as shown in the lower portion of FIG. 1. The same condition obtains with respect to the upper O-ring as viewed in FIG. 1, when the armature is in its opposite extreme position.

The valve armature 14 is provided midway between the end lands 15 with a central O-ring channel 18 having an O-ring 19 therein. The O-ring channel 18 is flanked by central lands 20 slightly greater in axial extent than the axial extent of the inlet slit 6. The purpose of this construction will be explained in more detail hereinafter. Between the central lands and the end lands 15, the valve armature 14 is reduced in diameter so that the annular inlet slit 6 may be connected to either of the annular channels 9 or 10.

The lower end chamber 3 is open to atmosphere but may be provided with a suitable air strainer 21. The upper or opposite end of the valve body 1 is internally screwthreaded for connection to a solenoid into which the valve armature 14 extends. A suitable sealing gland is provided around this end of the valve armature. Within the solenoid 22, the valve armature 14 is connected to a solenoid armature 24 in such a manner as to be drawn upwardly with the solenoid armature when the solenoid is energized.

The solenoid armature 24 is provided with a bore 25 which receives a spring 26 that bears against the upper end of the valve armature 14 to force the valve armature downward when the solenoid 22 is de-energized. An equalizer passage 27 extends through the valve armature 14 from the end chamber 3 so that the interior of the solenoid is exposed to atmospheric pressure.

Figure 3:
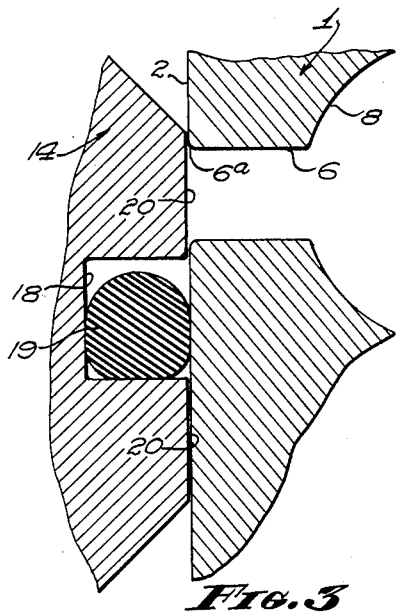
FIGURE 3 is an exaggerated sectional view in the plane of FIG. 1 showing the relation of the inlet port and O-ring as the O-ring is approaching or receding from the inlet port.
Figure 4:
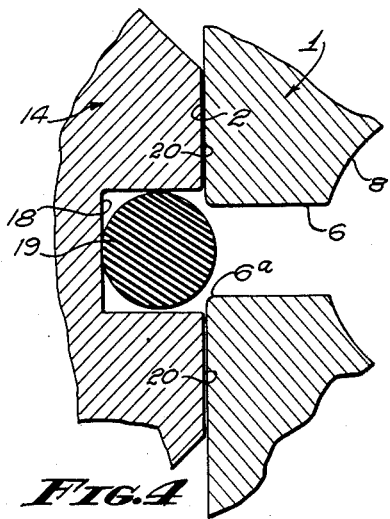
FIGURE 4 is a similar exaggerated sectional view showing the relation of the inlet port and O-ring as the O-ring passes the inlet port.

Operation of the high pressure valve is as follows:

When the valve armature 14 is in either extreme position, the O-ring 19 is in sealing engagement with the walls of the bore 2 on one side or the other of the annular inlet port 6. When the armature moves to the opposite extreme position, one of the central lands 20 momentarily restricts flow through the inlet slit 6 as shown in FIG. 3 so that the O-ring 19 may pass as shown in FIG. 4 without being subjected to high flow velocities which would unseat the O-ring. The other central land 20 continues to restrict flow through the inlet slit 6 until the valve armature has reached its other extreme position.

It will thus be seen that the force of the incoming fluid is evenly distributed against the O-ring by reason of the annular nature of the inlet port 6 and that, by reason of the fact that the inlet port is narrower than the lands 20, the flow is momentarily restricted to assist movement of the O-ring past the inlet port. The margins of the inlet port are rounded or chamfered slightly as indicated by 6a in FIGS. 3 and 4 to guide the slightly protruding surface of the O-ring back into its groove as the O-ring passes the inlet port.

While the unique relationship of the inlet port and the cooperating O-ring has been shown as a part of a four-way valve, it should be observed that this construction is equally adaptable to a three-way valve, or to normally open or normally closed line valves. Also, although the port and cooperating parts have been shown as an inlet port, the port may function equally well as an outlet port.

Furthermore, although the accompanying drawings illustrate and the foregoing specification describes one embodiment of the invention, it is to be understood that the invention is not limited thereto but is defined by the scope of the appended claims.

What is claimed is:

1. A valve structure, comprising: a valve body having a bore therein, and an inlet port in the form of an annular channel; a valve armature slidable in said valve body, said armature defining an annular O-ring groove and having flanking lands slidably fitting said bore, said lands having axial dimensions greater than said inlet port; and an O-ring in said groove adapted to pass across said inlet port while said lands restrict flow therethrough.

2. A valve structure, comprising: a valve body having a bore therein and at least one port intersecting said bore and in the form of a axially narrow annular channel; a valve armature slidable in said valve body and defining an annular O-ring groove having approximately the axial dimensions of the channel forming said port and at least one land flanking said groove and slidably fitting said bore, said land having an axial dimension greater than said port thereby to restrict flow therethrough during passage of said land across said port; and an O-ring in said groove adapted to pass across said port while said land restricts flow therethrough.

3. A valve structure, comprising: a valve body having a bore therein, an annular channel of relatively narrow axial dimension intersecting said bore to form a flow port, walls defining a flow duct surrounding said bore and communicating with said annular channel tending to produce uniform flow throughout the circumference of said annular channel; a valve armature slidable in said valve body, said armature defining an annular O-ring groove and having at least one flanking land slidably fitting said valve body bore, said land having an axial dimension greater than said inlet port; and an O-ring in said groove adapted to pass across said annular channel while said land restricts flow therethrough.

4. A valve structure, comprising: a valve body having a bore therein, an annular channel of relatviely narrow axial dimension intersecting said bore to form a flow port, walls defining a flow duct surrounding said bore and communicating with said annular channel tending to produce uniform flow throughout the circumference of said annular channel; a valve armature slidable in said valve body, said armature defining an annular O-ring groove having an axial dimension approximating the axial dimension of said annular channel, and lands flanking opposite sides of said groove forming a sliding and flow restricting fit in said bore and having axial dimensions greater than said annular channel; and an O-ring in said groove adapted to pass across said annular channel while said lands restrict flow therethrough.

5. A valve structure comprising:
(a) a single piece valve body having an armature bore therethrough, transverse bores approaching tangency with said armature bore, and a narrow annular slit extending from said armature bore into intersection with said transverse bores;
(b) a valve armature slidable in said armature bore, said armature defining an armature O-ring groove and having flanking lands slidably fitting said armature bore, said lands having axial dimensions greater than the width of said annular slit;
(c) and an O-ring in said groove adapted to pass across said annular slit while said lands restrict flow thereover.

References Cited in the file of this patent
UNITED STATES PATENTS

| | | |
|---|---|---|
| 583,822 | Shem | June 1, 1897 |
| 2,764,181 | Richolt | Sept. 25, 1956 |
| 2,869,583 | Beckett et al. | Jan. 20, 1959 |
| 2,887,127 | Broadbent | May 19, 1959 |
| 2,899,939 | Norris | Aug. 18, 1959 |

FOREIGN PATENTS

| | | |
|---|---|---|
| 829,785 | Great Britain | Mar. 9, 1960 |
| 850,222 | Great Britain | Oct. 5, 1960 |